March 12, 1935.
L. N. HAMPTON ET AL
1,993,781
ELECTRICALLY HEATED TOOL
Filed Aug. 5, 1931
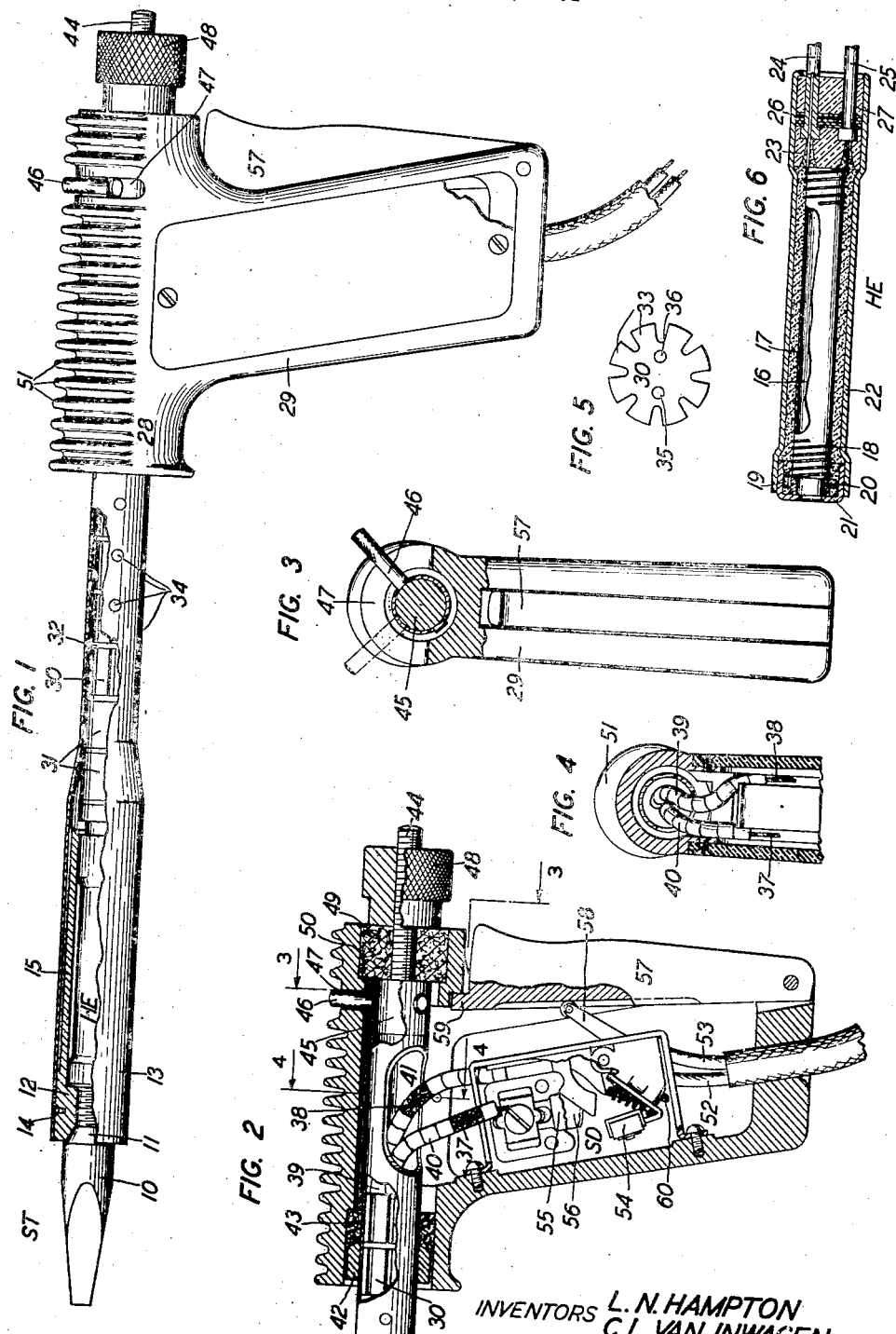
INVENTORS L. N. HAMPTON
C. L. VAN INWAGEN
BY J. MacDonald
ATTORNEY Patented Mar. 12, 1935

1,993,781

UNITED STATES PATENT OFFICE 1,993,781

ELECTRICALLY HEATED TOOL

Leon N. Hampton, New York, N. Y., and Charles L. Van Inwagen, Jr., Rutherford, N. J., assignors to Bell Telephone Laboratories, Incorporated, New York, N. Y., a corporation of New York Application August 5, 1931, Serial No. 555,175

6 Claims. (Cl. 219—26)

This invention relates to electrically heated tools and more specifically to that class of tools known as soldering coppers.

The object of this invention is to improve the construction and efficiency of such tools.

This object is accomplished by the provision of an improved combination of parts for the heating element and mounting the heat applying tool or soldering tip and the heating element in a bushing of a metal which is non-corrosive at ordinary soldering temperature whereby the heat generated by the heating element is efficiently transmitted to the soldering tip. This bushing is mounted at the end of a supporting shell of non-oxidizing material in a manner to provide a number of annular air spaces for thermally insulating this supporting shell from the heating element. The supporting shell is rotatably mounted in a barrel portion formed with a handle of a pistol type and is provided with a knob movable in a groove cut across the barrel portion for orientating the oblong shaped tip of the tool with respect to the handle for facilitating certain soldering operations as frequently met with in connection with soldering work in telephone exchanges. A switching device which is placed in the handle is operated through the movement of a trigger member mounted on the handle and controls the operation of the heating element. Cooling fins are provided around the barrel portion of the handle for dissipating the heat to the air for cooling the handle, and the insulating beads which support the wires connecting the heating element to the switching device in the handle are provided with parallel fins for dissipating the heat reaching these points and thereby assisting in the cooling of the handle.

A feature of the invention is an improved construction of the heating element whereby the heat generated by the resistance wire is efficiently transmitted to the soldering tip.

Another feature is a metallic handle having means for receiving a shell which carries the soldering tip, this shell being adjustable for moving the soldering tip in a number of positions with respect to the direction of the handle and thereby facilitating certain soldering operations.

Another feature is an improved insulating bead used for supporting the wires in the shell, the beads and shell having means whereby the heat from the element is ineffective to affect the normal temperature of the handle upon the operation of the tool.

Another feature is a switching device placed in the handle of the tool whereby the operation of the heating element is controlled in a simple and positive manner.

Other features of invention and advantages will appear from the following description and by the claims appended thereto, reference being had to the accompanying drawing in which:

Fig. 1 is an assembly view shown partly in section;

Fig. 2 is a partial view showing the handle in section;

Fig. 3 is a rear view partly in section taken on line 3, 3 of Fig. 2;

Fig. 4 is a sectional view taken on line 4, 4 of Fig. 2;

Fig. 5 is a front view of one of the insulating beads used in this tool; and

Fig. 6 is a longitudinal view of the heating element.

In the drawing a heat applying tool or soldering tip ST is made of a copper portion 10 and a portion 11 of a non-corrosive material such as silver which is screw threaded for engagement with a similar threaded portion in a silver bushing 12. The front end of this bushing has a chamfered seat for receiving the shoulder of the silver portion 11 as shown in Fig. 1. Bushing 12 is mounted in a tubular supporting shell 13 of a non-corrosive material generally of a chromium nickel steel alloy commercially known as "Enduros" and is secured therein by a number of rivets such as 14. This bushing is provided with a reduced portion 15 extending about three quarters of its length to form an annular air space provided for thermally insulating the supporting shell 13 from the heat generated by a heating element HE mounted in the bushing 12 contiguous to the soldering tool ST as shown in Figs. 1 and 6.

Heating element HE consists of a core 16 of "Monel" metal on which is wrapped a strip of insulating material 17 such as Mica. On the strip 17 is wound the resistance wire 18 in a non-inductive manner. The loop end of the wire engages a lug 19 formed at the periphery of a lavite ring 20 mounted on the front end of the core. At this end, the core is welded to a cup-shaped member 21 preferably made of semi-precious metal such as silver to prevent oxidation and at the same time to provide a good thermal path toward the soldering tip 10. On the periphery of cup-shaped member 21 there is welded a silver sleeve 22 which cooperates with the heating coil thus formed to form an annular space in which is packed a good thermal and electrical insulating material such as magnesium oxide and in the free end of this sleeve is mounted a lavite bead 23 provided with flared holes as shown in Fig. 6 for receiving the ends of resistance wire 18. The ends of wire 18 thread through metallic bushings 24 and 25 mounted in a pile-up arrangement of mica washers 26 and through an insulating bead 27. The shell is held in a single unit formation by a portion of sleeve 22 spun over the edge of bead 27. The sleeve 22 is afterward reduced in diameter for a substantial portion of its length in order to obtain a dense mass of insulation around the heating coil 18 and thereby denuding the magnesium oxide of gaseous substance to prevent the oxidation of the resistance wire and the consequent burning of this wire.

The other end of supporting sleeve 13 extends in a barrel portion 28 formed with a handle 29 preferably made of cast aluminum and disposed at an angle with respect to the handle. In this portion of the supporting shell there are mounted a number of ceramic beads 30 and 31 separated one from the other by mica washers such as 32 shown in Fig. 1. Beads 30 are provided with parallel fin members 33 which cooperate with holes 34 disposed along this portion of the shell for cooling it. Each of these beads is provided with holes 35 and 36 in which the wires 37 and 38 thread. These wires are provided for connecting the ends of resistance wire 18 to a switching device SD mounted in the handle 29, these wires being insulated for a small distance of their length by respective row of insulating beads 39 and 40 passing through an aperture 41 in the shell 13 as shown in the Figs. 2 and 4.

On the reduced portion of supporting shell 13 is mounted a collar 42 having a tapered face for engagement with a registering seat in an insulating ring 43 and in the end of the supporting shell is mounted a threaded stud 44 having an enlarged portion 45 of a diameter corresponding to the inside diameter of the shell and a knob 46 extending across the shell 13 and the portion 45 of stud 44 is provided for rotating the shell within an angular distance defined by a groove 47 cut across the barrel portion of the handle for adjusting the soldering tip ST with respect to the handle for facilitating certain soldering connections as often met in connection with soldering work, particularly in telephone exchanges. The shell and the soldering tip carried thereby are held in adjusted position by a knob 48 threadedly engaging the stud 44 and abutting against an insulating washer 49 which is forced against the shoulder portion 50 in the barrel portion 28, the annular space formed by the shell 13 and the barrel portion 28 being provided for thermally insulating the handle from the shell and fin members 51 are provided around the barrel portion 28 for assisting in the cooling of the handle.

Wires 37 and 38 are connected to current supply wires 52 and 53 through a switching device SD having a bridge portion 54 movable in engagement with switch blades 55 and 56 upon the operation of a trigger member 57 operatively connected to the switch 57 by the switch actuating arm 58, and a stop 59 carried by the trigger member 57 is provided for maintaining this trigger in the non-operated position against the action of a retracting spring 60 provided for disengaging the bridge piece 54 from switch blades 55 and 56, such operation being effected automatically upon the release of the trigger member 57 by the operator.

What is claimed is:

1. In an electrically heated soldering tool, a supporting shell, a bushing mounted in one end of said shell, a heat applying means secured to said bushing, a heating element for said means mounted in said bushing and removable from one end thereof independently of said heat applying means and said shell, said element comprising a core of non-oxidizable material, a layer of insulating material wrapped around said core, a resisting material wrapped around said core, a resistance wire coiled on said insulation, a silver cup-shaped member welded at one end of said core, a silver sleeve having one end welded to said member and extending beyond the other end of said core, insulating material interposed between said sleeve and said coil, a plurality of insulating members mounted in said sleeve contiguous to said insulating core, and metallic sleeves mounted in said insulating members and electrically connecting with the ends of said wire, said insulating members and said metallic sleeves forming with said core and silver sleeve a self-contained unit.

2. In an electrically heated soldering tool, a handle formed with a barrel portion, a tubular supporting shell having one end rotatable engaging the barrel portion of said handle, a heat applying means, a heating element for said means mounted in the other end of said shell, means for securing said shell in said barrel portion and means for adjustably rotating said shell into said barrel for adjusting the position of said heat applying means with respect to said handle.

3. An electrically heated soldering tool comprising a handle having a barrel portion formed at an angle therewith, a tubular shell rotatably mounted in said barrel, a heating element in said shell, a heat applying means mounted in one end of said shell in end to end engaged relation with said element and having an oblong-shaped heat transferring portion, means for rotating said shell in the barrel portion of said handle for moving said means in a number of axial positions with respect to the direction of said handle, and means carried by the barrel portion of said handle for limiting the adjusting movement of said shell.

4. In an electrically heated soldering tool, a heat applying means having a substantially flat heating transferring portion, a heating element for said means, a bushing having portions for receiving said means and said element, a supporting shell for said bushing, a metallic handle having a barrel portion for receiving said shell and extending in position substantially at right angles thereto, means mounted in each end of said barrel portion for heat insulating said shell from said barrel portion, means for rotating said shell in said barrel for changing the position of said heat applying means with respect to said handle and means carried by said shell and engaging the second mentioned means for adjustably securing said shell in said barrel in each adjusted position.

5. An electrically heated soldering tool comprising a handle formed with a barrel portion disposed at an angle with respect to the direction of said handle, a heat applying means having a substantially flat heat transferring portion, a heater element for said means, a tubular support for said means and said element mounted for rotatable adjusting movement in the barrel portion of said handle for changing the position of said heat applying means with respect to said handle, a switching device in said handle, means in said shell electrically connecting said element to said switching device and a lever member pivoted at the rear of said handle and operable for actuating said switch for controlling the operation of said element.

6. In an electrical heating soldering tool, a heat applying means having a substantially flat heat transferring portion, a supporting shell, a bushing mounted in one end of said shell having means for receiving said heat applying means, a heating element mounted in said bushing in contacting relation with said heat applying means, said element being removable from said bushing independently of said heat applying means and said shell, a handle having a barrel portion loosely engaging the other end of said shell and extending substantially at right angles therewith, stop means carried by said barrel portion and means for rotating said shell in said barrel portion for changing the position of said heat applying means with respect to said handle, said means cooperating with said stop means in said barrel portion for limiting the movement of said shell.

LEON N. HAMPTON.
CHARLES L. VAN INWAGEN, Jr.